(12) United States Patent
Roberts et al.

(10) Patent No.: US 10,125,611 B2
(45) Date of Patent: Nov. 13, 2018

(54) SYSTEM AND METHOD FOR IN SITU REPAIR OF TURBINE BLADES OF GAS TURBINE ENGINES

(71) Applicant: General Electric Company, Schenectady, NY (US)

(72) Inventors: Herbert Chidsey Roberts, Middletown, OH (US); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 15/045,812

(22) Filed: Feb. 17, 2016

(65) Prior Publication Data

US 2017/0234132 A1    Aug. 17, 2017

(51) Int. Cl.

| | |
|---|---|
| *B21D 3/16* | (2006.01) |
| *F01D 5/00* | (2006.01) |
| *F01D 5/02* | (2006.01) |
| *F01D 5/12* | (2006.01) |
| *B23P 6/00* | (2006.01) |
| *F01D 25/28* | (2006.01) |

(52) U.S. Cl.
CPC ............... *F01D 5/005* (2013.01); *B21D 3/16* (2013.01); *B23P 6/002* (2013.01); *F01D 5/02* (2013.01); *F01D 5/12* (2013.01); *F01D 25/285* (2013.01); *F05D 2220/32* (2013.01); *F05D 2230/80* (2013.01); *F05D 2240/307* (2013.01)

(58) Field of Classification Search
CPC .... B21D 3/10; B21D 3/14; B21D 3/16; F01D 5/005; F01D 25/285; F05D 2230/80; B23P 6/002
See application file for complete search history.

(56) References Cited

U.S. PATENT DOCUMENTS

| | | |
|---|---|---|
| 2,946,118 A | 7/1960 | Steck |
| 3,709,632 A | 1/1973 | Emmerson et al. |
| 4,024,646 A * | 5/1977 | Griggs ................... G01B 5/205 33/546 |

(Continued)

FOREIGN PATENT DOCUMENTS

| | | |
|---|---|---|
| DE | 4318425 C1 | 10/1994 |
| EP | 2036646 A1 | 3/2009 |

(Continued)

OTHER PUBLICATIONS

Translation, FR 1482191A, May 1967.*

(Continued)

*Primary Examiner* — Edward Tolan
(74) *Attorney, Agent, or Firm* — General Electric Company; Brian Overbeck (57) ABSTRACT

The present disclosure is directed to an improved system and method for repairing a bend in a turbine blade of a turbine of a gas turbine engine. The system includes an articulating guide configured to fit into an access port of the turbine. The articulating guide includes a proximal end and a distal end. The system also includes a repair tool configured at the distal end of the articulating guide. Further, the repair tool is configured to fit over the turbine blade. Thus, the repair tool is configured to bend the turbine blade to an unbent position while the turbine blade is secured within the turbine.

13 Claims, 8 Drawing Sheets

(56) References Cited

U.S. PATENT DOCUMENTS

| | | | |
|---|---|---|---|
| 4,409,717 A | 10/1983 | Boozer | |
| 4,581,802 A | 4/1986 | Castoe | |
| 4,589,175 A | 5/1986 | Aggrioni | |
| 4,845,992 A * | 7/1989 | Dean | F01D 9/041 29/889.22 |
| 5,197,191 A | 3/1993 | Dunkman et al. | |
| 5,713,233 A | 2/1998 | McCarthy et al. | |
| 5,913,555 A | 6/1999 | Richter et al. | |
| 6,302,625 B1 * | 10/2001 | Carey | B23C 3/12 29/402.19 |
| 7,032,279 B2 | 4/2006 | McCarvill et al. | |
| 7,293,964 B2 | 11/2007 | Gümmer | |
| 7,353,579 B2 | 4/2008 | Piccioni | |
| 7,449,658 B2 | 11/2008 | Mielke | |
| 7,766,726 B2 | 8/2010 | Sherlock et al. | |
| 8,039,773 B2 | 10/2011 | Spallek et al. | |
| 8,713,775 B2 * | 5/2014 | Zhang | F01D 5/005 29/281.6 |
| 8,726,502 B2 | 5/2014 | Clark et al. | |
| 8,839,516 B2 | 9/2014 | Bertoli et al. | |
| 9,039,490 B2 | 5/2015 | Kelly et al. | |
| 9,056,371 B2 | 6/2015 | Czerner | |
| 9,085,053 B2 * | 7/2015 | Tholen | B23P 6/007 |
| 2009/0000102 A1 * | 1/2009 | Willis | B23P 6/002 29/402.21 |
| 2009/0094829 A1 * | 4/2009 | Bunting | B23P 6/002 29/888.021 |
| 2009/0313822 A1 * | 12/2009 | Lee | B21D 3/14 29/889.1 |
| 2013/0161297 A1 | 6/2013 | Czemer | |
| 2013/0219982 A1 | 8/2013 | Feldmann et al. | |
| 2013/0232792 A1 | 9/2013 | Quinones et al. | |
| 2014/0305270 A1 | 10/2014 | Withey et al. | |

FOREIGN PATENT DOCUMENTS

| | | | |
|---|---|---|---|
| EP | 2 158 062 A1 | 3/2010 | |
| FR | 1482191 A * | 5/1967 | B21D 3/16 |

OTHER PUBLICATIONS

Extended European Search Report and Opinion issued in connection with corresponding EP Application No. 7156142.6 dated Jul. 13, 2017.

Unofficial English Translation of Chinese Office Action issued in connection with corresponding CN Application No. 201710085953.6 dated Jul. 16, 2018.

* cited by examiner

SYSTEM AND METHOD FOR IN SITU REPAIR OF TURBINE BLADES OF GAS TURBINE ENGINES

FIELD OF THE INVENTION

The present invention relates generally to gas turbine engines, and more specifically, to systems and methods for in-situ repair of turbine blades of gas turbine engines.

BACKGROUND OF THE INVENTION

A gas turbine engine generally includes, in serial flow order, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as a rotor shaft, rotor disks mounted or otherwise carried by the rotor shaft, turbine blades mounted to and radially extending from the periphery of the disks, and various stationary turbine components such as stator vanes or nozzles, turbine shrouds, and engine frames. The rotatable and stationary turbine components at least partially define the hot gas path through the turbine section. For example, the gas turbine buckets or blades generally have an airfoil shape designed to convert the thermal and kinetic energy of the flow path gases into mechanical rotation of the rotor. As the combustion gases flow through the hot gas path, thermal energy is transferred from the combustion gases to the rotatable and stationary turbine components. Such gas turbine engines are commonly employed on an aircraft.

During operation, turbine blades can be damaged by ingestion of various substances, e.g. ice ingestion, which can be difficult and expensive to repair. More specifically, such ingestion can cause blade tip or leading/trailing edge damage which includes local tip bending. To repair such damage using conventional methods, large bending tools are used which require certain individual gas turbine components to be removed from the gas turbine assembly. In some instances, the gas turbine engine may have to be removed from the wing of the aircraft. Thus, such repairs can be time-consuming and expensive.

In view of the aforementioned, an improved system and method for in-situ (i.e. on-wing) repairing of turbine blade would be advantageous. More specifically, a system and method for repairing of turbine blade using a local in-situ repair tool would be desired in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for repairing a bend in a turbine blade of a turbine of a gas turbine engine. The system includes an articulating guide configured to fit into an access port of the turbine. Further, the articulating guide includes a proximal end and a distal end. The system also includes a repair tool configured at a distal end of the articulating guide. Moreover, the repair tool is configured to fit over the turbine blade. Thus, the repair tool is configured to bend the turbine blade to an unbent position while the turbine blade is secured within the turbine.

In another aspect, the present disclosure is directed to a method for repairing a bend in a turbine blade of a turbine of a gas turbine engine. The method includes inserting an articulating guide into an access port of the turbine, wherein the articulating guide has a repair tool at a distal end thereof. Thus, the method also includes positioning the repair tool over the turbine blade in a first direction. Further, the method includes pulling the repair tool along a chord of the turbine blade in a second, opposite direction so as to bend or shape the turbine blade back to an unbent position.

In yet another aspect, the present disclosure is directed to a method for repairing a bend in a turbine blade of a gas turbine engine. The method includes inserting an articulating guide into an access port of the turbine, with the articulating guide having a repair tool at a distal end thereof. The method also includes mounting the repair tool to the turbine blade. Further, the method includes applying force, via the repair tool, at the bend of the turbine blade so as to bend or shape the blade back to an unbent position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to an improved system and method for repairing a bend in a turbine blade (e.g. in the blade tip and/or the leading or trailing edges) of a turbine of a gas turbine engine. The system includes an articulating guide configured to fit into an access port of the turbine and a repair tool configured at a distal end of the articulating guide. Further, the repair tool is configured to fit over the turbine blade. Thus, the repair tool is configured to bend or shape the turbine blade to an unbent position while the turbine blade is secured within the turbine, i.e. in situ.

It should be appreciated that the disclosed system and method may generally be used to perform in situ repairs of turbine blades located within any suitable type of gas turbine engine, including aircraft-based turbine engines and land-based turbine engines, regardless of the engine's current assembly state (e.g., fully or partially assembled). Additionally, with reference to aircraft engines, it should be appreciated that the present subject matter may be implemented on-wing or off-wing.

Thus, the present disclosure provides many advantages not present in the prior art. For example, when servicing a gas turbine engine, some repair activities require access to bending tools that are large and require certain parts of the individual gas turbine components to be removed from the gas turbine assembly. Thus, the in situ repairs of the present disclosure lower the service time and cost associated with repairing damaged blades. More specifically, the present disclosure is configured to perform restorative shaping in situ using internal or temporary grounding and force application tools, which reduces the level of disassembly that is required to field service a gas turbine engine. As such, the present disclosure reduces time and labor requirements associated with bent turbine blades. Further, the present disclosure provides a simple repair method, thereby making in-situ repairs of turbine blades easy and efficient.

Figure 1:
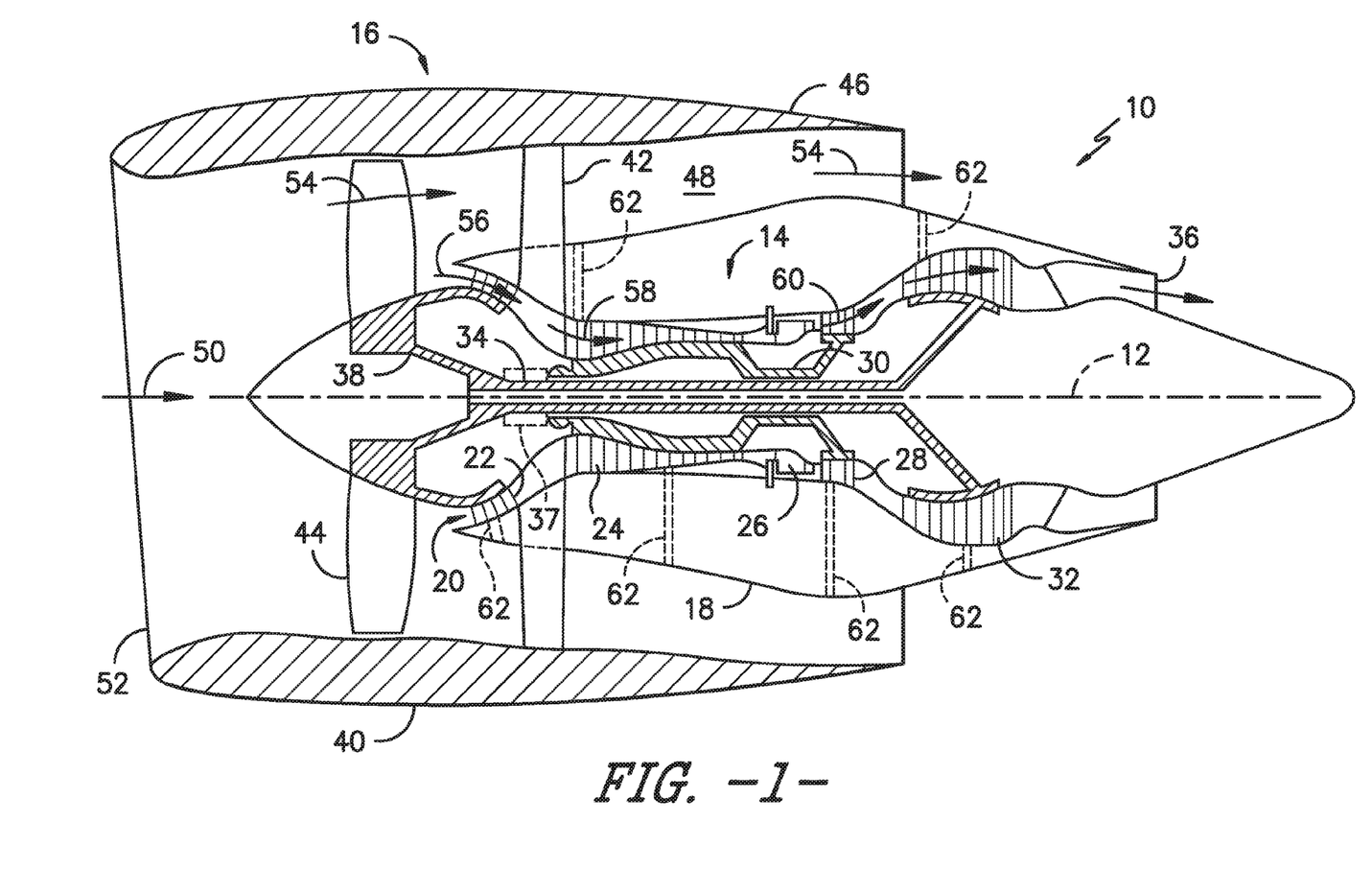
FIG. 1 illustrates a cross-sectional view of one embodiment of a gas turbine engine that may be utilized within an aircraft according to the present disclosure.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine 10 may include access ports 62 providing access to any suitable internal location of the engine 10, such as by including access ports 62 that provide access within the combustor 26 and/or any other suitable component of the engine 10.

Figure 2:
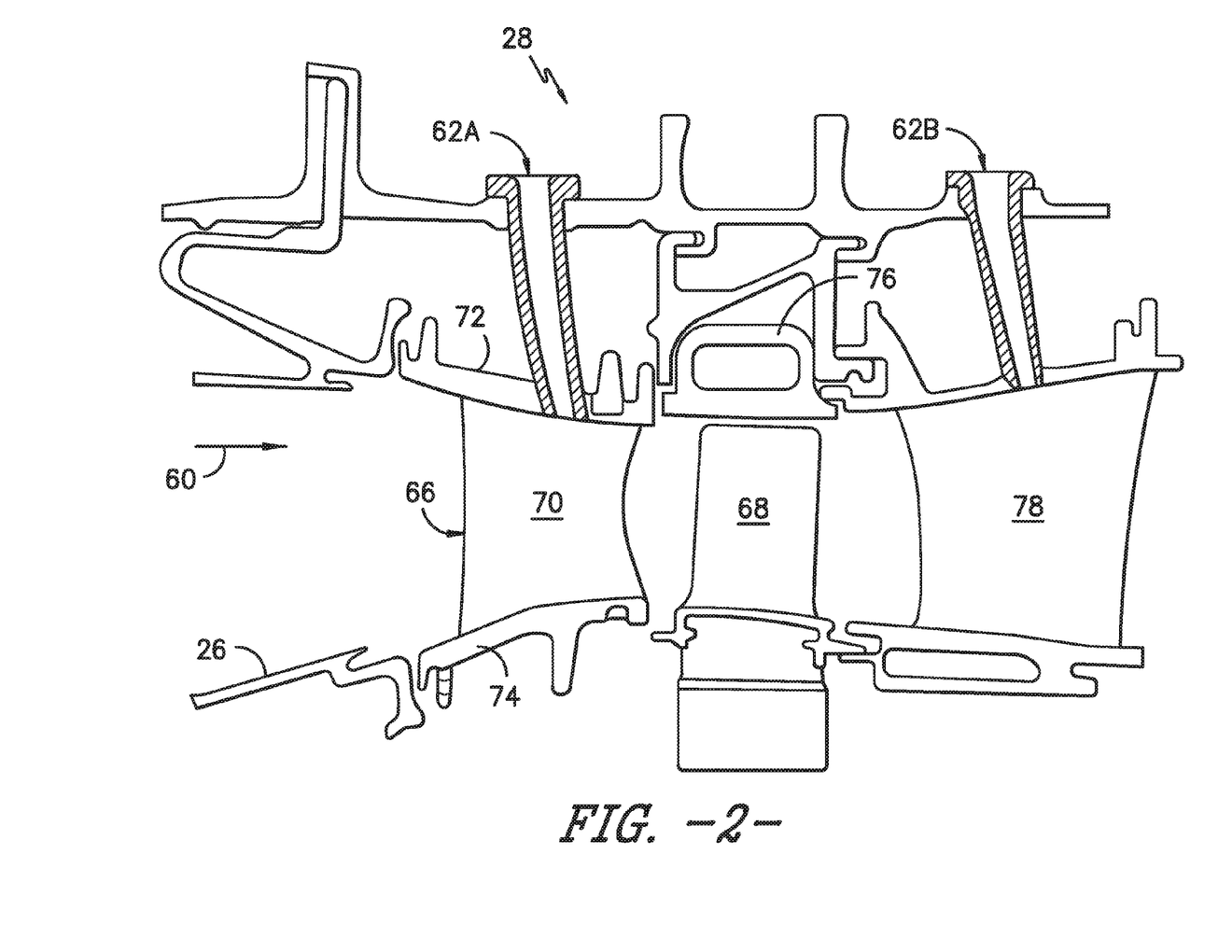
FIG. 2 illustrates a partial, cross-sectional view of one embodiment of a turbine suitable for use within the gas turbine engine shown in FIG. 1, particularly illustrating access ports defined in the engine for providing internal access to the turbine.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 62A, 62B may be defined through the turbine casing and/or frame, with each access port 62A, 62B being configured to provide access to the interior of the turbine 28 at a different axial location. Specifically, as indicated above, the access ports 62A, 62B may, in several embodiments, be spaced apart axially such that each access port 62A, 62B is aligned with or otherwise provides interior access to a different stage of the turbine 28. For instance, as shown in FIG. 2, a first access port 62A may be defined through the turbine casing/frame to provide access to the first stage of the turbine 28 while a second access port 62B may be defined through the turbine casing/frame to provide access to the second stage of the turbine 28.

It should be appreciated that similar access ports 62 may also be provided for any other stages of the turbine 28 and/or for any turbine stages of the second (or low pressure) turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
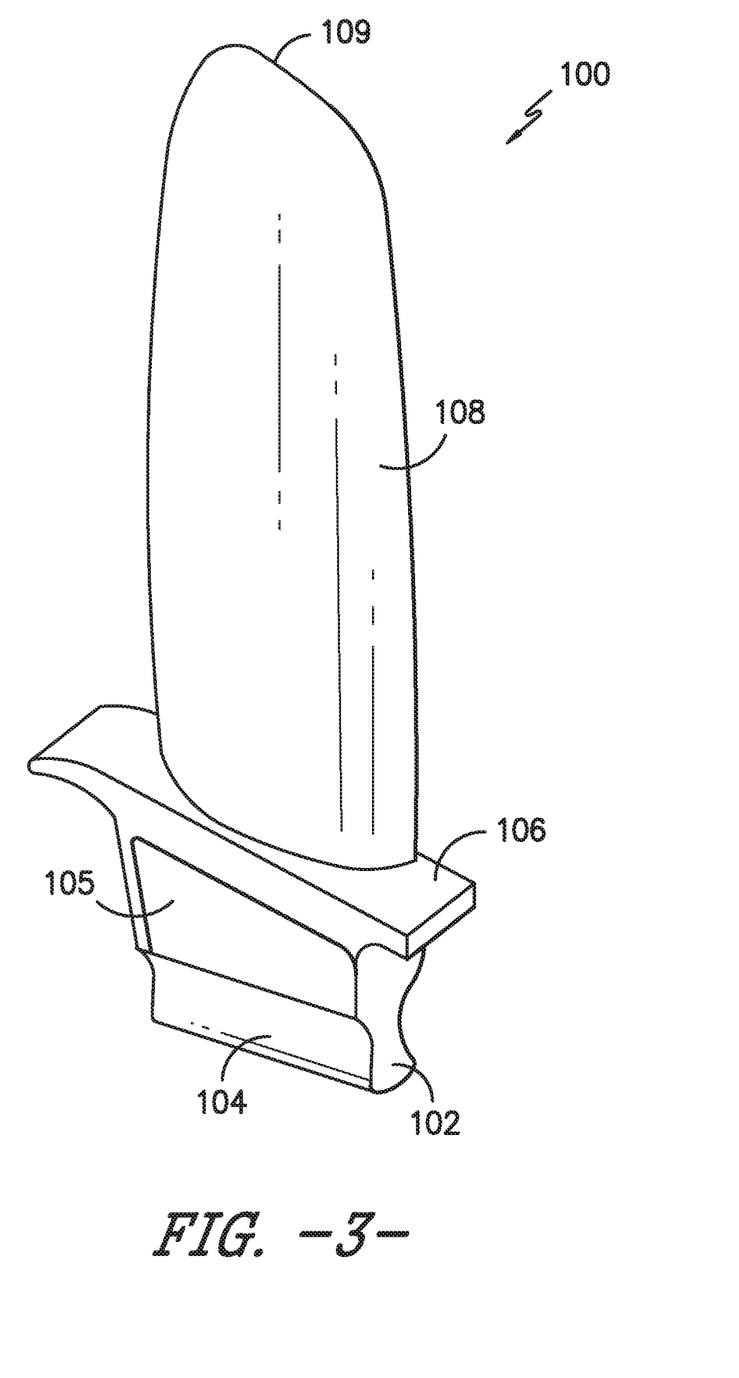
FIG. 3 illustrates a perspective view of one embodiment of a turbine blade of a turbine of a gas turbine engine according to the present disclosure.

Referring now to FIG. 3, an exemplary turbine blade 100 of the gas turbine engine 10 of FIG. 1 is illustrated. As shown, the blade 100 is generally represented as being adapted for mounting to a disk or rotor (not shown) within the turbine section of the gas turbine engine 10. For this reason, the turbine blade 100 is represented as including a dovetail 102 for anchoring the blade 100 to a turbine disk by interlocking with a complementary dovetail slot formed in the circumference of the disk. As represented in FIG. 2, the interlocking features may include protrusions referred to as tangs 104 that engage recesses defined by the dovetail slot. The blade 100 is further shown as having a platform 106 that separates an airfoil 108 from a shank 105 on which the dovetail 102 is defined. The turbine blade 100 also includes a blade tip 109 disposed opposite the platform 106, a leading edge 105, and a trailing edge 107. As such, the blade tip 109 generally defines the radially outermost portion of the blade 100 and, thus, may be configured to be positioned adjacent to a stationary shroud (not shown) of the gas turbine engine 10.

During operation of the gas turbine engine 100, ingestion of various substances (such as ice) into the HP or LP turbines 28, 32 can damage the turbine blade 100. Further, because they are directly subjected to hot combustion gases during operation of the engine 10, the airfoil 108 (including the leading and trailing edges 105, 107), platform 106, and/or blade tip 109 typically have very demanding material requirements. The platform 106 and the blade tip 109 are further critical regions of the turbine blade 100 in that they create the inner and outer flowpath surfaces for the hot gas path within the turbine section. In addition, the platform 106 creates a seal to prevent mixing of the hot combustion gases with lower temperature gases to which the shank 105, its dovetail 102, and the turbine disk are exposed. Further, the blade tip 109 may be subjected to creep due to high strain loads and wear interactions between it and the shroud surrounding the blade tips 109. The dovetail 102 is also a critical region in that it is subjected to wear and high loads resulting from its engagement with a dovetail slot and the high centrifugal loading generated by the blade 100. As such, the present disclosure is directed to an improved system and method for repairing the turbine blades 100 in the event that the blade 100 is bent during operation, e.g. via ingestion.

Figure 4:
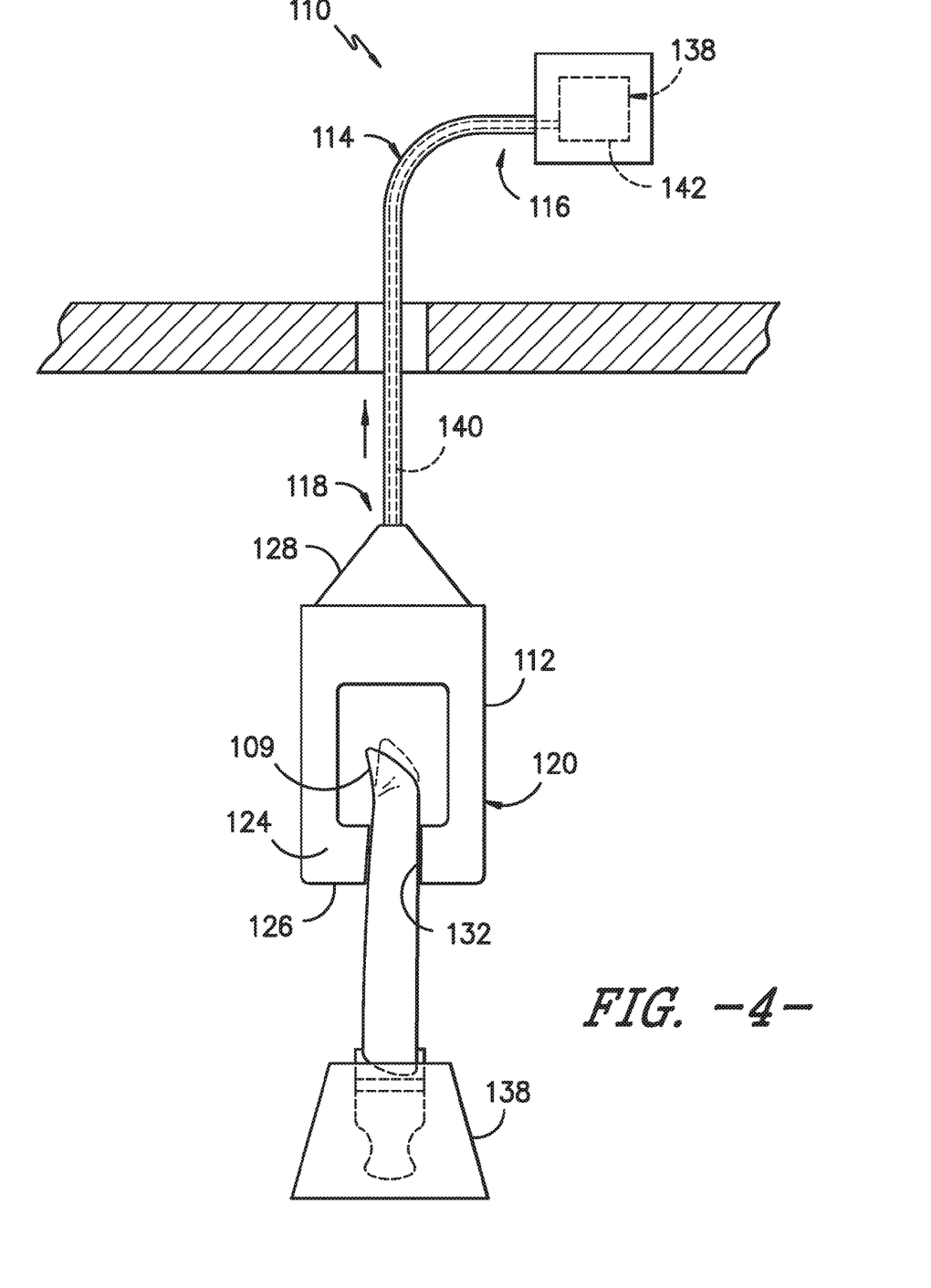
FIG. 4 illustrates a simplified view of one embodiment of a system for performing an in situ repair of a turbine blade of a gas turbine engine according to the present disclosure, particularly illustrating a repair tool inserted through an access port of the engine to access the turbine blade.
Figure 5:
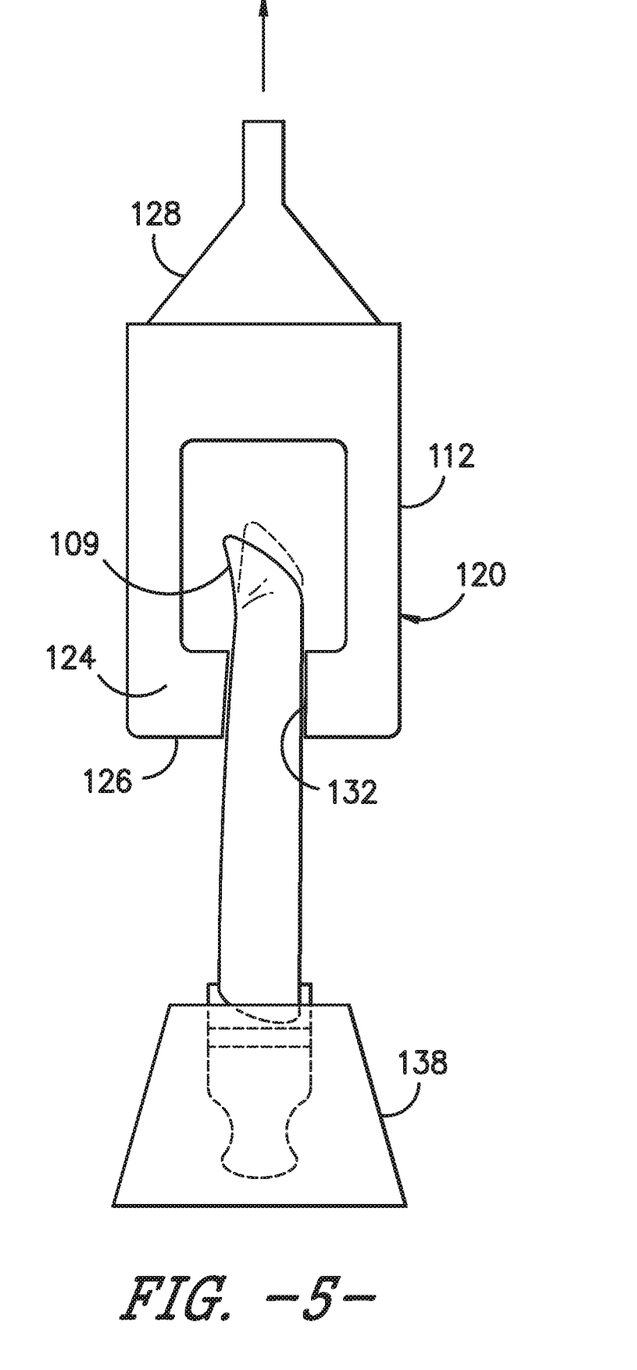
FIG. 5 illustrates a partial view of one embodiment of a repair tool temporarily secured to a blade tip of the turbine blade in order to perform an in situ repair thereon.
Figure 6:
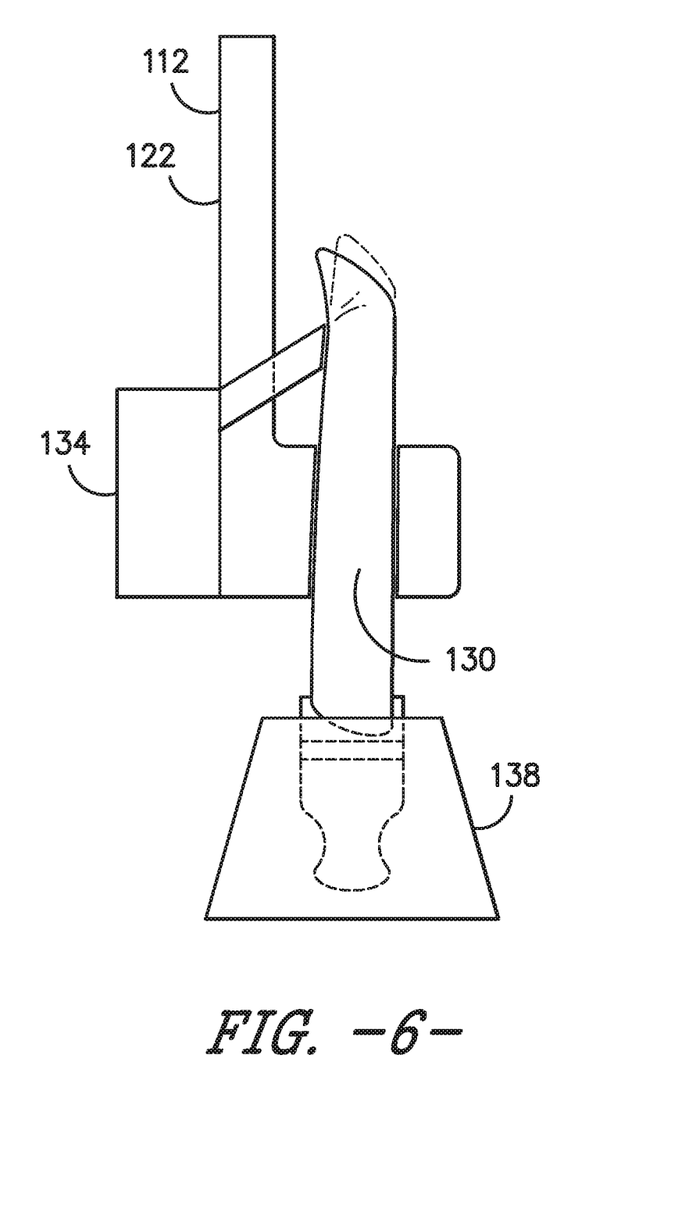
FIG. 6 illustrates a partial view of another embodiment of a repair tool temporarily secured to a blade tip of the turbine blade in order to perform an in situ repair thereon.

Referring now to FIG. 4, a simplified view of one embodiment of a system 110 for performing an in situ repair of a turbine blade 100 of a gas turbine engine 10 is illustrated according to the present disclosure. More specifically, as shown, the system 110 is configured to repair a bend in the blade tip 109 or the leading and trailing edges 105, 107 of the turbine blade 100. Further, as shown, the system 110 includes an articulating guide configured to fit into an access port 62 of the turbine 28, 32 and a repair tool 112. The articulating guide as described herein may include any suitable guide or arm configured to fit within various ports 62 and/or the inlet 52 of the engine 10. For example, in one embodiment, the articulating guide may include a snake-arm robot. More specifically, the articulating guide has a proximal end 116 and distal end 118. Thus, as shown, the repair tool 112 is configured with the distal end 118 of the articulating guide 114 such that the tool 112 can be easily inserted through an access port 62 of the gas turbine engine 10, such as any of the access ports 62 described above with reference to FIGS. 1-3, to allow an in situ repair procedure to be performed on the turbine blade 100. Further, as shown in FIGS. 4-6, the repair tool 112 may be configured to fit over the blade tip 109. Moreover, the repair tool 112 is configured to bend or reshape the turbine blade 100 to its original, unbent position while the turbine blade 100 is secured within the turbine 28, 32, i.e. in-situ.

Referring now to FIG. 5, a detailed view of the blade tip 109 of the turbine blade 100 configured with one embodiment of the repair tool 112 according to the present disclosure is illustrated. In general, the repair tool 112 may correspond to any suitable tool(s) and/or component(s) that may be inserted through an access port 62 of the gas turbine engine 10 and attach onto the turbine blade 100 to perform repair work thereon. For example, as shown in FIGS. 4 and 5, the repair tool 112 may include a repair fixture 120. In certain embodiments, the repair fixture 120 may include a working head 124 defining a first end 126 and second end 128. Further, as shown in FIG. 5, the first end 126 may be configured to slide over the blade tip 109 of the turbine blade 100 in a first direction, whereas the second end 128 may be configured with the articulating guide 114. More specifically, as shown, the working body 124 may include a cavity 130 configured to receive the blade tip 109 through a slot 132 thereof when the first end 126 is slid over the blade tip 109. Thus, to repair the tip, the repair tool 112 is pulled in a second, opposite direction so as to reshape the blade tip 109, i.e. bend the blade tip 109 to its original unbent position.

In alternative embodiments, as shown in FIG. 6, the repair tool 112 may include a repair clamp 122 that temporarily mounts to the turbine blade 100, e.g. to the blade tip 109. More specifically, as shown, the repair clamp 122 may include a slot 136 configured to receive the blade tip 109 therein. Further, as shown, the repair clamp 122 may include a drive mechanism 134 configured to shape or bend the blade tip 109 to its original position. For example, in certain embodiments, the drive mechanism 134 may include an electrical drive mechanism, a hydraulic drive mechanism, a pneumatic drive mechanism, or any other suitable drive mechanism. Thus, the drive mechanism is configured to apply a restoring force against the blade tip 109 to realign the bent tip back in to service.

In addition, as shown in FIGS. 5 and 6, the system 110 may also include a mounting component 138 for securing grounding a blade root of the turbine blade 100 to a fixed location in the gas turbine engine 10. More specifically, in certain embodiments, the fixed location may include a disk of the turbine 28, 32. Thus, the mounting component 138 is configured to supply additional support to the blade 100 during the repair process such that the blade 100 does not move as the bend is being repaired.

Referring to FIGS. 4-6, the repair tool 112 may also include a heating element 140 at its working end to heat the turbine blade 100 before bending the tip 109. For example, the working head 122 may include a heating component 140 to locally heat the blade tip 109 before, during, and/or after bending thereof. For example, the heating component 140 may direct thermal energy into the blade tip 109. Further, as shown in FIG. 4, the heating elements (indicated by dashed lines 140) may be provided in operative association within the articulating guide 114.

In general, the heating element(s) 140 may be configured to generate heat within the articulating guide 114. For example, in one embodiment, the heating element(s) 140 may correspond to a resisting heating element(s), such as one or more resistance wires, that is integrated into or incorporated within a wall(s) of the articulating guide 114. However, in another embodiment, the heating element(s) 140 may correspond to any other suitable heat generating device(s) and/or component(s) that may be used to provide heating within the articulating guide 114.

Referring back to FIG. 4, the articulating guide 114 may also include an articulation assembly 138 that allows the orientation of the repair tool 112 to be adjusted within the interior of the gas turbine engine 10. For example, the articulation assembly 138 may allow for the repair tool 112 to be rotated or pivoted about a single axis or multiple axes to adjust the orientation of the repair tool 112 relative to the turbine blade 100. It should be appreciated that the articulation assembly 138 may generally have any suitable configuration and/or may include any suitable components that allow for adjustment of the orientation of the repair tool 112 relative to the turbine blade 100. For example, in one embodiment, a plurality of articulation cables 140 may be coupled between the repair tool 112 and one or more articulation motors 142. In such an embodiment, by adjusting the tension of the cables 140 via the motor(s) 142, the repair tool 112 may be reoriented within the gas turbine engine 10.

Figure 7:
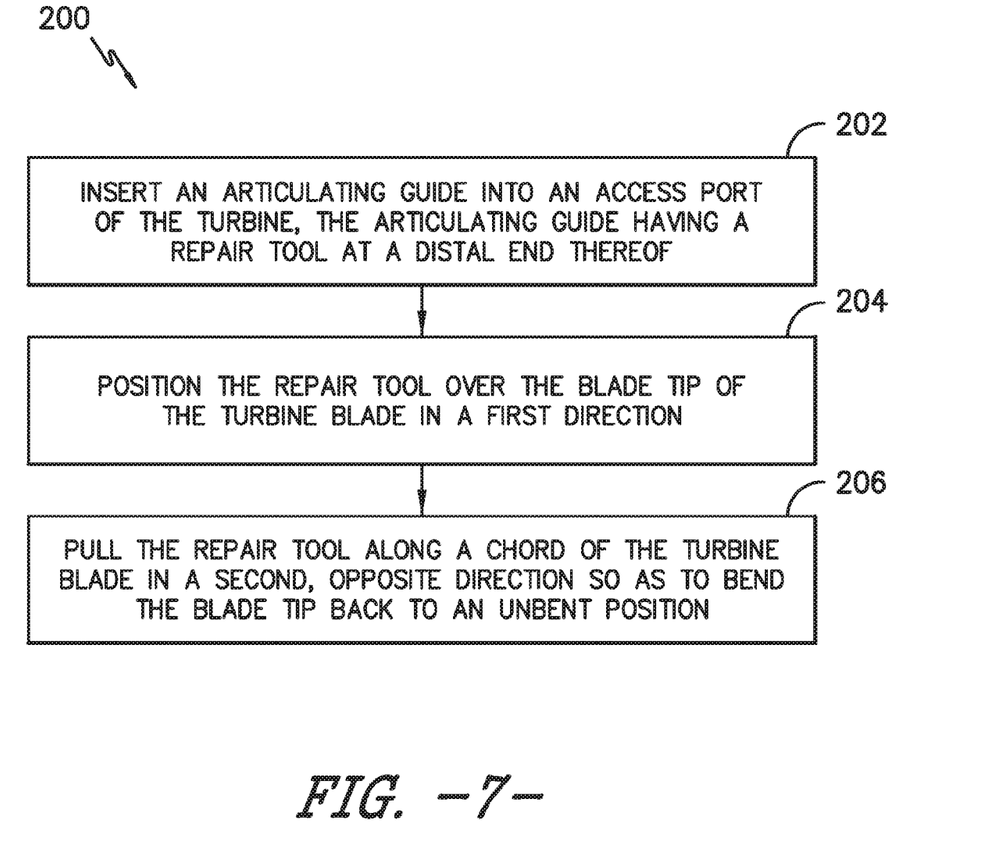
FIG. 7 illustrates a flow diagram of one embodiment of a method for repairing a bend in blade tip of a turbine blade of a turbine of a gas turbine engine according to the present disclosure.

Referring now to FIG. 7, a flow diagram of one embodiment of a method 200 for repairing a bend in a turbine blade 100 is illustrated. As shown at 202, the method 200 includes inserting an articulating guide 114 into an access port 62 of the turbine 100, wherein the articulating guide 114 has a repair tool 112 at a distal end 118 thereof. For example, in such embodiments, the repair tool 122 may correspond to the repair fixture 120 of FIG. 5. Thus, as shown at 204, the method 200 includes positioning the repair tool 112 over the turbine blade 100 in a first direction. As shown at 206, the method 200 includes pulling the repair tool 112 along a chord of the turbine blade 100 in a second, opposite direction so as to bend the turbine blade 100 back to an unbent position.

Figure 8:
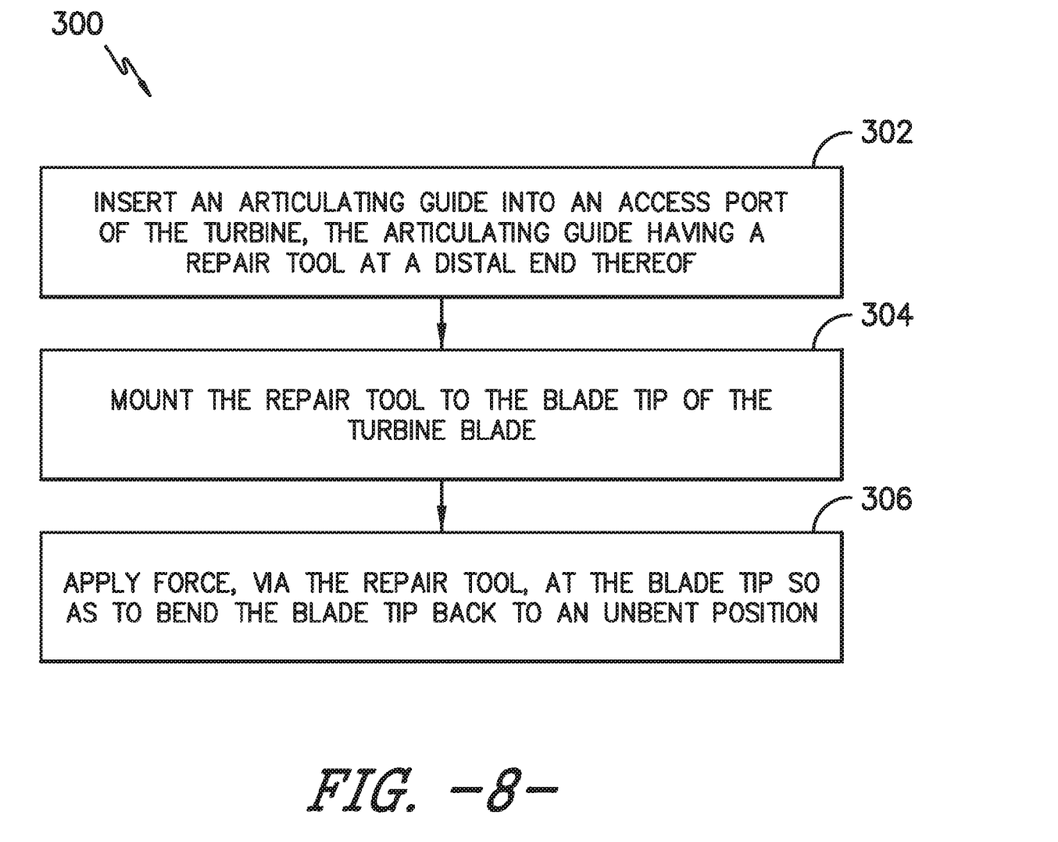
FIG. 8 illustrates a flow diagram of another embodiment of a method for repairing a bend in blade tip of a turbine blade of a turbine of a gas turbine engine according to the present disclosure.

Referring now to FIG. 8, a flow diagram of another embodiment of a method 300 for repairing a bend in a turbine blade 100 is illustrated. As shown at 302, the method 300 includes inserting an articulating guide 114 into an access port 62 of the turbine 28, 32, with the articulating guide having a repair tool 112 at a distal end thereof. For example, in such embodiments, the repair tool 122 may correspond to the repair clamp 122 of FIG. 6. Thus, as shown at 304, the method 300 also includes mounting the repair tool 122 to the turbine blade 100. As shown at 306, the method 300 includes applying force, via the repair tool 112, at the bend of the turbine blade 100 so as to bend the blade 100 back to its original, unbent position, i.e. before the tip was damaged.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for repairing a bend in a turbine blade of a turbine of a gas turbine engine, the system comprising:
    an articulating guide configured to fit into an access port of the turbine, the articulating guide comprising a proximal end and a distal end; and
    a repair tool configured at a distal end of the articulating guide, the repair tool comprising a first end having a through hole configured to slide over a blade tip of the turbine blade, the through hole comprising side walls that abut against the blade tip of the turbine blade so as to secure the repair tool to the blade tip, the repair tool further comprising a repair arm configured to apply force in a linear direction to bend the turbine blade to an unbent position while the turbine blade is secured within the turbine.

2. The system of claim 1, wherein the bend is located in one of the blade tip, a leading edge, or a trailing edge of the turbine blade.

3. The system of claim 1, further comprising a mounting component for securing a blade root of the turbine blade to a fixed location in the gas turbine engine.

4. The system of claim 3, wherein the fixed location comprises a disk of the turbine.

5. The system of claim 2, wherein the repair tool comprises at least one of a repair fixture or a repair clamp.

6. The system of claim 5, wherein the repair fixture comprises a working head defining a first end and second end, the first end configured to slide over the blade tip of the turbine blade in a first direction, the second end configured with the articulating guide.

7. The system of claim 6, wherein the working body further comprises a cavity configured to receive the blade tip through a slot thereof when the first end is slid over the blade tip.

8. The system of claim 5, wherein the repair clamp further comprises a drive mechanism configured to drive the repair arm to bend the turbine blade to the unbent position.

9. The system of claim 8, wherein the drive mechanism comprises at least one of an electrical drive mechanism, a hydraulic drive mechanism, or a pneumatic drive mechanism.

10. A method for repairing a bend in blade tip of a turbine blade of a gas turbine engine, the method comprising:
    inserting an articulating guide into an access port of the turbine, the articulating guide having a repair tool at a distal end thereof, the repair tool having a first end having a through hole;
    inserting a blade tip of the turbine blade into the through hole and sliding the first end of the repair tool over the blade tip so as to secure the repair tool to the blade tip, the through hole having side walls that abut against the blade tip of the turbine blade;
    applying linear force, via a repair arm of the repair tool, at the bend of the turbine blade so as to bend the turbine blade back to an unbent position.

11. The method of claim 10, further comprising securing a blade root of the turbine blade to a fixed location in the gas turbine engine, wherein the fixed location comprises a disk of the turbine.

12. The method of claim 11, wherein the repair tool comprises a drive mechanism configured to drive the repair arm to bend the turbine blade to the unbent position.

13. The method of claim 12, wherein the drive mechanism comprises at least one of an electrical drive mechanism, a hydraulic drive mechanism, or a pneumatic drive mechanism.

* * * * *